(12) United States Patent
Fang et al.

(10) Patent No.: US 12,476,531 B2
(45) Date of Patent: Nov. 18, 2025

(54) BOOTSTRAP APPARATUS AND CONTROL METHOD

(71) Applicant: Halo Microelectronics International, Campbell, CA (US)

(72) Inventors: Zhao Fang, Plano, TX (US); Yang Xu, Allen, TX (US); Wenchao Qu, Plano, TX (US)

(73) Assignee: Halo Microelectroincs International, Campbell, CA (US)

( * ) Notice: Subject to any disclaimer, the term of this patent is extended or adjusted under 35 U.S.C. 154(b) by 230 days.

(21) Appl. No.: 18/221,877

(22) Filed: Jul. 13, 2023

(65) Prior Publication Data

US 2025/0023445 A1   Jan. 16, 2025

(51) Int. Cl.
*H02M 3/158* (2006.01)
*H02M 1/00* (2006.01)

(52) U.S. Cl.
CPC ......... *H02M 1/0054* (2021.05); *H02M 3/158* (2013.01)

(58) Field of Classification Search
CPC ............. H02M 1/0054; H02M 1/0048; H02M 1/0051; H02M 1/0058; H02M 3/158; H02M 3/156; H02M 3/1563; H02M 3/1566; H02M 3/157; H02M 3/1582; H02M 3/1584; H02M 3/1586
See application file for complete search history.

(56) References Cited

U.S. PATENT DOCUMENTS

| 2008/0129372 | A1* | 6/2008 | Rozsypal | H02M 3/07 327/536 |
| 2014/0217959 | A1* | 8/2014 | Chen | H02J 7/00 323/311 |
| 2015/0061611 | A1* | 3/2015 | Li | H02M 3/1588 323/235 |

\* cited by examiner

*Primary Examiner* — Nguyen Tran
(74) *Attorney, Agent, or Firm* — AP3 Law Firm PLLC (57) ABSTRACT

An apparatus includes a first switch and a second switch connected in series between an input voltage bus and ground, a bootstrap capacitor connected between a bootstrap voltage bus, and a common node of the first switch and the second switch, and a bias power control circuit configured to function as a switched capacitor bootstrap circuit when the apparatus is configured to operate in a high impedance PFM mode, and configured to function as an active bootstrap circuit when the apparatus is configured to operate in another operating mode.

18 Claims, 7 Drawing Sheets

BOOTSTRAP APPARATUS AND CONTROL METHOD

TECHNICAL FIELD

The present invention relates to a bootstrap apparatus and control method, and, in particular embodiments, to a bootstrap apparatus and control method for efficiently operating a bias power control circuit in the PFM mode of a power converter.

BACKGROUND

Pulse frequency modulation (PFM) is a switching method commonly used in many power converters to improve efficiency at light loads. In particular, when the load of a power converter (e.g., a buck power converter) is light, the power converter reduces the switching frequency so as to reduce switching losses, thereby increasing the overall efficiency of the power converter. In contrast, in a conventional continuous conduction mode, the switching frequency of the power converter remains constant even at light loads, resulting in unnecessary switching losses. The PFM mode is especially useful in some battery powered applications.

Figure 1:
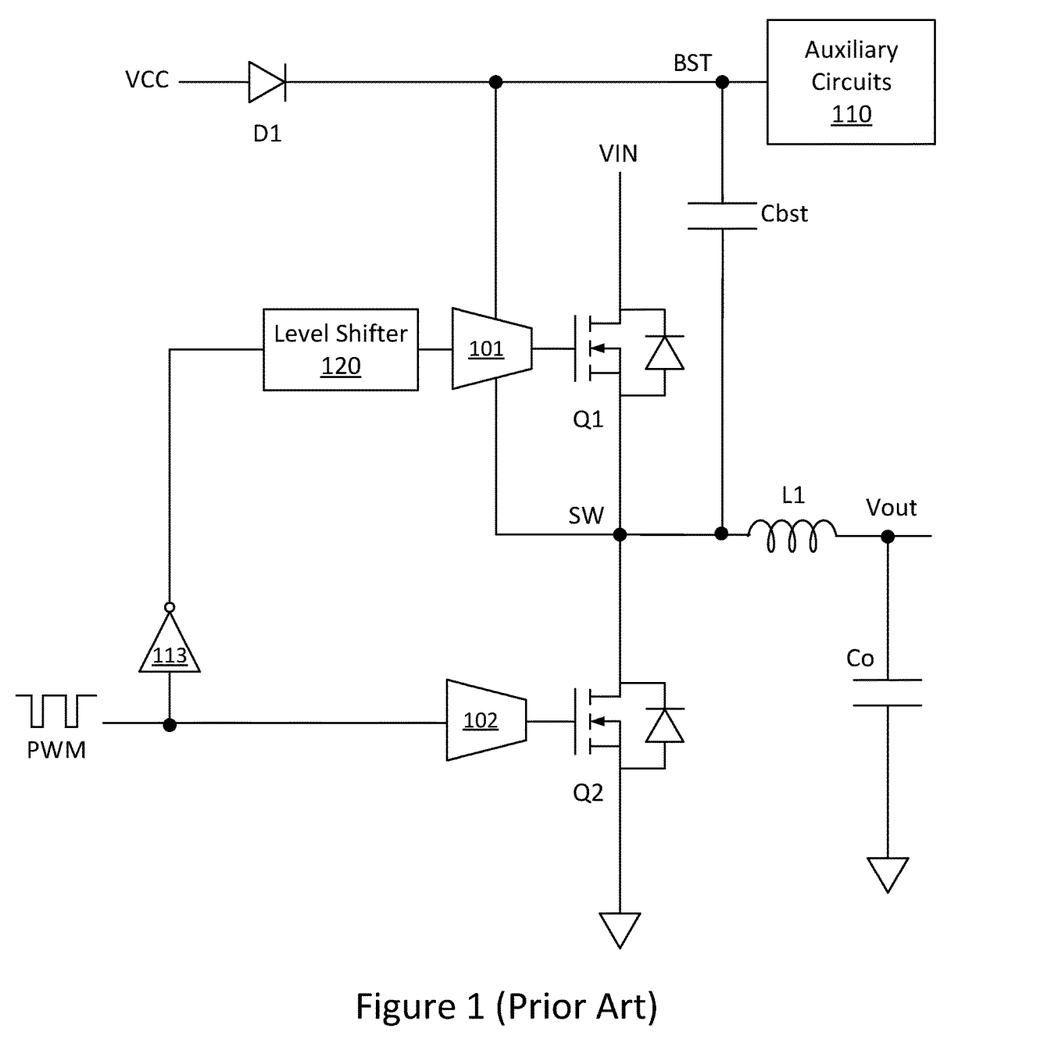
FIG. 1 illustrates a power converter including a bootstrap circuit.

FIG. 1 illustrates a power converter including a bootstrap circuit. The power converter includes a high-side switch Q1, a low-side switch Q2, an inductor L1 and an output capacitor Co. The high-side switch Q1 and the low-side switch Q2 are connected in series between an input voltage bus VIN and ground. The common node of Q1 and Q2 is a switching node (SW) of the power converter. The inductor L1 is connected between the switching node SW and the output Vout of the power converter. The output capacitor Co is connected between Vout and ground.

The power converter further comprises an inverter 113, a level shifter 120, a first driver 101, a second driver 102, a diode D1, a bootstrap capacitor Cbst and auxiliary circuits 110. The second driver 102 is employed to generate the gate drive signal applied to the low-side switch Q2. The inverter 113, the level shifter 120 and the first driver 101 are employed to generate the gate drive signal applied to the high-side switch Q1. The diode D1 and the bootstrap capacitor Cbst form a bootstrap circuit configured to provide bias power for the first driver 101 and the auxiliary circuits 110.

In operation, when the power converter operates in the pulse width modulation (PWM) mode, the low-side switch Q2 and the high-side switch Q1 are turned on alternately. When the low-side switch Q2 is turned on and the high-side switch Q1 is turned off, the switching node SW is pulled down to ground. A bias voltage VCC charges the bootstrap capacitor Cbst through the diode D1. The voltage across Cbst is equal to VCC minus the diode voltage drop of D1. When the low-side switch Q2 is turned off and the high-side switch Q1 is turned on, the switching node SW is pulled up to VIN. In response to the voltage change on SW, the voltage on the voltage bus BST is also raised to VIN plus the voltage across the bootstrap capacitor Cbst.

After several cycles, the voltage across the bootstrap capacitor Cbst reaches a steady state. The voltage across the bootstrap capacitor Cbst is equal to difference of VCC and VD. VD is the forward voltage drop of the diode D1.

In the PFM mode, when the output voltage of the power converter is lower than a preset threshold, the controller (not shown) of the power converter controls the high-side switch Q1 of the power converter to turn on, and at the same time controls the low-side switch Q2 to turn off. The input voltage VIN charges the inductor L1. The current flowing through the inductor L1 increases in a linear manner. After a certain time, the controller turns off the high-side switch Q1, and at the same time turns on the low-side switch Q2, so that the SW node is grounded and the inductor current continues to flow. Once Q2 is turned on, the inductor current begins to drop. When the inductor current drops to zero, the controller turns off both the high-side switch Q1 and the low-side switch Q2, and enters into a high impedance state. Both Q1 and Q2 remain off until the output voltage of the power converter drops below the preset threshold. The control method described above can make the power converter not switch for a long time, thereby reducing switching losses and improving light load efficiency.

The PFM mode of the power converter brings new challenges to the design of the bootstrap circuit. For example, the voltage bus BST is usually used to supply power for auxiliary circuits 110 (e.g., current detection circuits). If the low-side switch Q2 and the high-side switch Q1 are in the high-impedance state for a long time in the PFM mode, the charge stored on the bootstrap capacitor Cbst cannot be replenished. At the same time, the charge on the bootstrap capacitor Cbst is configured to supply power to the auxiliary circuits 110. Since the bootstrap capacitor Cbst is not replenished, the voltage on the voltage bus BST may be not stable in consideration with the power consumption of the auxiliary circuits 110. In order to maintain a stable voltage on the BST voltage bus, the low-side switch Q2 may be periodically turned on for a short time. The bootstrap capacitor Cbst is replenished through the turn on of Q2. However, this solution may bring unnecessary switching losses. It would be desirable to have an efficient bias power control circuit to reduce the switching losses of the power converter. The present disclosure addresses this need.

SUMMARY

These and other problems are generally solved or circumvented, and technical advantages are generally achieved, by preferred embodiments of the present disclosure which provide a bootstrap apparatus and control method for efficiently operating a bias power control circuit in the PFM mode.

In accordance with an embodiment, an apparatus comprises a first switch and a second switch connected in series between an input voltage bus and ground, a bootstrap capacitor connected between a bootstrap voltage bus, and a common node of the first switch and the second switch, and a bias power control circuit configured to function as a switched capacitor bootstrap circuit when the apparatus is configured to operate in a high impedance PFM mode, and configured to function as an active bootstrap circuit when the apparatus is configured to operate in another operating mode.

In accordance with another embodiment, a method comprises in a high impedance PFM mode, enabling a switched capacitor bootstrap circuit to provide bias power for a power converter comprising a high-side switch and a low-side switch connected in series, and a bootstrap capacitor connected between a bootstrap voltage bus, and a common node of the high-side switch and the low-side switch, and in another operation mode of the power converter, enabling an active bootstrap circuit to provide the bias power for the power converter.

In accordance with yet another embodiment, a power converter comprises a high-side switch and a low-side switch connected in series between an input voltage bus and ground, a bootstrap capacitor connected between a bootstrap voltage bus, and a common node of the high-side switch and the low-side switch, an inductor coupled between the common node of the high-side switch and the low-side switch, and an output of the power converter, an output capacitor coupled between the output of the power converter and ground, and a bias power control circuit configured as a switched capacitor bootstrap circuit when the power converter is configured to operate in a high impedance PFM mode, and configured as an active bootstrap circuit when the power converter is configured to operate in another operating mode.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a bootstrap apparatus and control method for efficiently operating the bootstrap apparatus in the PFM mode. The disclosure may also be applied, however, to a variety of power converters such as buck converters, boost converters, buck-boost converters, half-bridge converters, full-bridge converters and hybrid converters combining a buck or boost converter with switched capacitors circuits. Hereinafter, various embodiments will be explained in detail with reference to the accompanying drawings.

Figure 2:
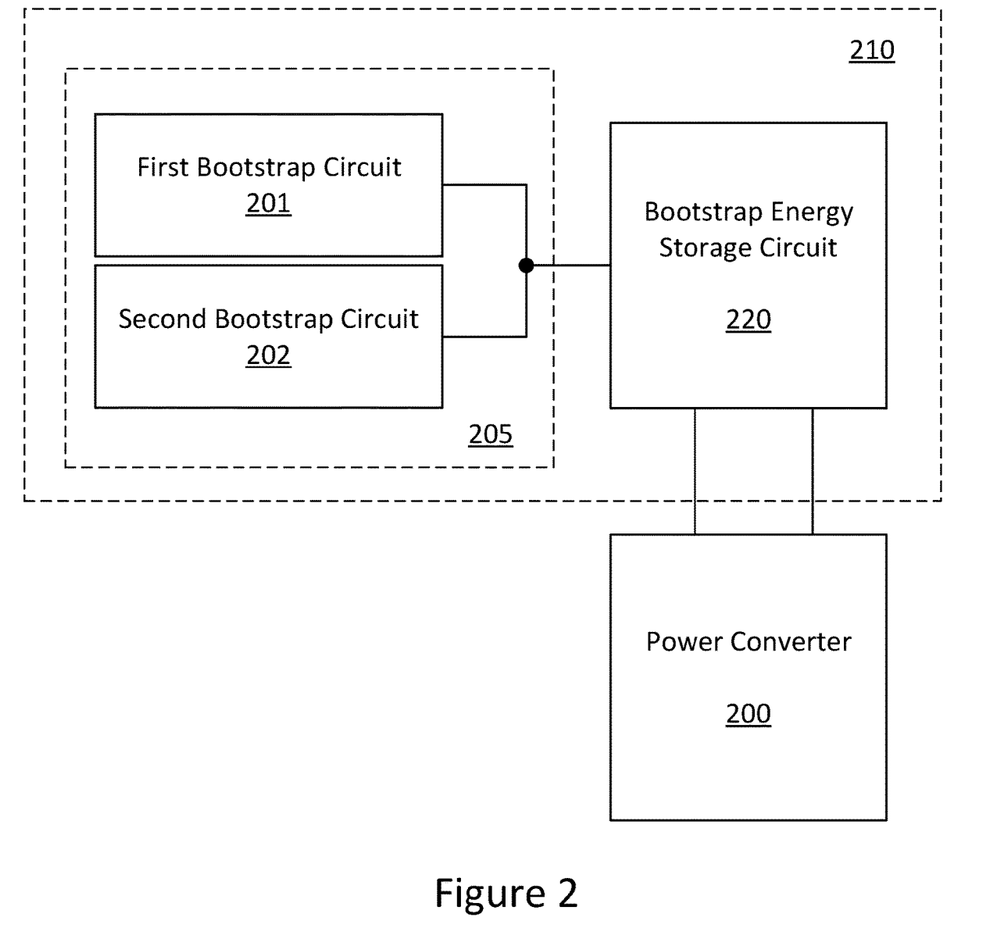
FIG. 2 illustrates a block diagram of a bootstrap circuit and the associated power converter in accordance with various embodiments of the present disclosure.

FIG. 2 illustrates a block diagram of a bootstrap circuit and the associated power converter in accordance with various embodiments of the present disclosure. The power converter 200 is a power conversion apparatus having a high-side switch and a low-side switch connected in series. The high-side switch is implemented as an n-type power switch. When the high-side switch is turned on, the source of the high-side switch is approximately equal to the input voltage of the power converter. Therefore, the gate drive voltage of the n-type power switch is equal to the sum of the input voltage and the gate-source voltage of the n-type power switch. In other words, the gate drive voltage is higher than the input voltage of the power converter. A bootstrap circuit 210 is employed to generate bias power for the high-side switch of the power converter 200.

As shown in FIG. 2, the bootstrap circuit 210 comprises a bootstrap energy storage unit 220 and a bias power control circuit 205. Throughout the description, the bias power control circuit 205 may be alternatively referred to as a bootstrap apparatus. In some embodiments, the bootstrap energy storage unit 220 is implemented as a ceramic capacitor or a plurality of ceramic capacitors connected in parallel. The bias power control circuit 205 comprises a first bootstrap circuit 201 and a second bootstrap circuit 202. As shown in FIG. 2, the outputs of the first bootstrap circuit 201 and the second bootstrap circuit 202 are connected together, and further connected to the bootstrap energy storage unit 220.

In an embodiment of implementing the bias power control circuit 205, the first bootstrap circuit 201 is an active bootstrap circuit, and the second bootstrap circuit 202 is a switched capacitor bootstrap circuit. The detailed structure and operating principle of this implementation of the will be described below with respect to FIG. 3.

In another embodiment of implementing the bias power control circuit 205, the first bootstrap circuit 201 and the second bootstrap circuit 202 may share some bootstrap components (e.g., flying capacitors and diodes) through a plurality of multiplexers. The detailed structure and operating principle of this implementation of the will be described below with respect to FIG. 5.

In yet another embodiment of implementing the bias power control circuit 205, the first bootstrap circuit 201 and the second bootstrap circuit 202 may share some bootstrap components (e.g., flying capacitors and diodes) through a plurality of multiplexers and a plurality of discrete components. The detailed structure and operating principle of this implementation of the will be described below with respect to FIG. 6.

In operation, the bias power control circuit 205 is configured as a switched capacitor bootstrap circuit when the power converter 200 is configured to operate in a high impedance PFM mode. On the other hand, the bias power control circuit 205 is configured as an active bootstrap circuit when the power converter 200 is configured to operate in another operating mode such as a PWM mode.

Figure 3:
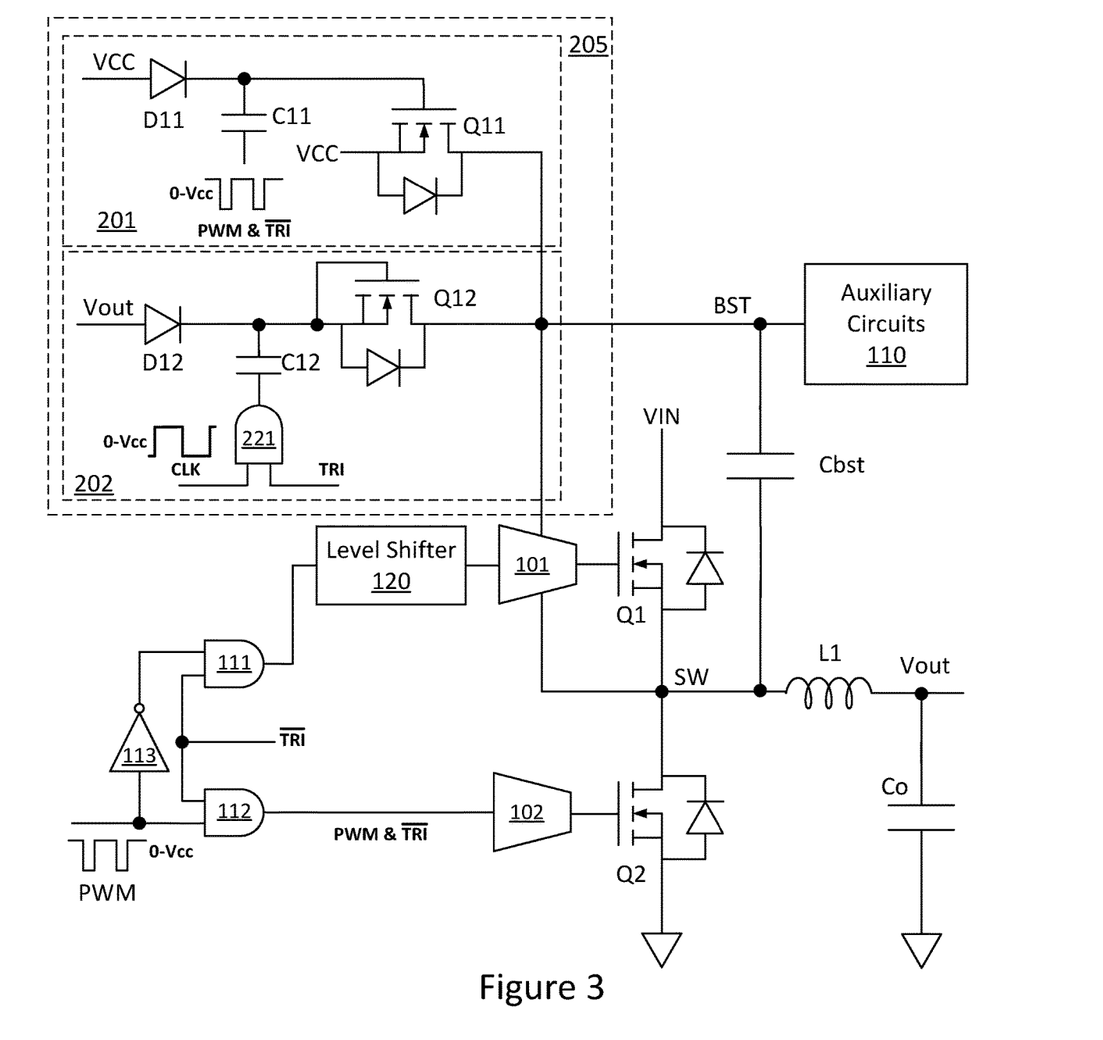
FIG. 3 illustrates a schematic diagram of a first implementation of the bootstrap circuit shown in FIG. 2 in accordance with various embodiments of the present disclosure.

FIG. 3 illustrates a schematic diagram of a first implementation of the bootstrap circuit shown in FIG. 2 in accordance with various embodiments of the present disclosure. The power converter comprises a high-side switch Q1 and a low-side switch Q2 connected in series between an input voltage bus VIN and ground. The power converter further comprises an inductor L1 and an output capacitor Co. The inductor L1 is connected between a common node of the high-side switch Q1 and the low-side switch Q2, and an output of the power converter. The output capacitor Co is connected between the output of the power converter and ground.

The power converter further comprises an inverter 113, a first AND gate 111, a second AND gate 112, a level shifter 120, a first driver 101, a second driver 102, a bias power control circuit 205, a bootstrap capacitor Cbst and auxiliary circuits 110. The second AND gate 112 and the second driver 102 are employed to generate the gate drive signal applied to the low-side switch Q2. The inverter 113, the first AND gate 111, the level shifter 120 and the first driver 101 are employed to generate the gate drive signal applied to the high-side switch Q1. The bias power control circuit 205 and the bootstrap capacitor Cbst form a bootstrap circuit configured to provide bias power for the first driver 101.

The bias power control circuit 205 comprises a first bootstrap circuit 201 and a second bootstrap circuit 202. The first bootstrap circuit 201 is an active bootstrap circuit. Throughout the description, the first bootstrap circuit 201 may be alternatively referred to as an active bootstrap circuit 201. The second bootstrap circuit 202 is a switched capacitor bootstrap circuit. Throughout the description, the second bootstrap circuit 202 may be alternatively referred to as a switched capacitor bootstrap circuit 202.

As shown in FIG. 3, the active bootstrap circuit 201 comprises a first diode D11, a first flying capacitor C11 and a first auxiliary switch Q11. Q11 is an n-type power switch. The first diode D11 and the first flying capacitor C11 are connected in series between a bias voltage VCC and a signal source. The output of the signal source is a result of an AND operation performed on a PWM voltage and an inverted signal of a high impedance operation indication signal TRI. The PWM voltage is a PWM signal of the power converter. In some embodiments, the PWM signal has a logic high level and a logic low level as shown in FIG. 3. The logic high level is equal to the bias voltage VCC. The logic low level is equal to the ground potential of the power converter. When the power converter is configured to operate in the high impedance mode, the high impedance operation indication signal TRI is in a logic high state. The inverted signal of a high impedance operation indication signal TRI is in a logic low state. The signal source outputs the logic low state. In this particular case, the logic low state of the signal source is at ground potential (GND). In other words, the first diode D11 and the first flying capacitor C11 are connected in series between the bias voltage VCC and GND. On the other hand, When the power converter is configured to operate in another operating mode such as a PWM mode, the high impedance operation indication signal TRI is in a logic low state. The inverted signal of the high impedance operation indication signal TRI is in a logic high state. The signal source outputs the PWM voltage. In other words, the first diode D11 and the first flying capacitor C11 are connected in series between the bias voltage VCC and the PWM voltage.

A gate of the first auxiliary switch Q11 is connected to a common node of the first diode D11 and the first flying capacitor C11. A first drain/source terminal of the first auxiliary switch Q11 is connected to the bias voltage VCC. A second drain/source terminal of the first auxiliary switch Q11 is connected to the bootstrap capacitor Cbst. In some embodiments, the first drain/source terminal of Q11 is a source terminal of Q11. The second drain/source terminal of Q11 is a drain terminal of Q11.

The switched capacitor bootstrap circuit 202 comprises a second diode D12, a second flying capacitor C12, a second auxiliary switch Q12 and an AND gate 221. Q12 is an n-type power switch. The second diode D12 and the second flying capacitor C12 are connected in series between an output voltage Vout of the power converter and an output of the AND gate 221. The output of the AND gate 221 is a result of an AND operation performed on a clock signal voltage CLK and the high impedance operation indication signal TRI. The clock signal voltage is the voltage of a clock signal used in the control circuit of the power converter. In some embodiments, the clock signal has a logic high level and a logic low level as shown in FIG. 3. The logic high level is equal to the bias voltage VCC. The logic low level is equal to the ground potential of the power converter. When the power converter is configured to operate in the high impedance mode, the high impedance operation indication signal TRI is in a logic high state. The AND gate 221 outputs the clock signal voltage CLK. In other words, the second diode D12 and the second flying capacitor C12 are connected in series between Vout and the clock signal voltage CLK when the power converter is configured to operate in the high impedance mode. On the other hand, When the power converter is configured to operate in another operating mode such as a PWM mode, the high impedance operation indication signal TRI is in a logic low state. The AND gate 221 outputs a logic low voltage. In this particular case, the logic low state of the signal source is at ground potential. In other words, the second diode D12 and the second flying capacitor C12 are connected in series between Vout and GND.

A second drain/source terminal of the second auxiliary switch Q12 is connected to the bootstrap capacitor Cbst. A gate and a first drain/source terminal of the second auxiliary switch Q12 are connected together, and further connected to a common node of the second diode D12 and the second flying capacitor C12.

In operation, when the power converter operates in the high impedance PFM mode, TRI is in a logic high state. The inverted signal of TRI is in a logic low state. The voltage across C11 is equal to the bias voltage VCC minus a diode voltage drop (the voltage across D11). The gate voltage of Q11 is less than the source voltage of Q11. As a result, Q11 is turned off. When TRI is in a logic high state, the AND gate 221 outputs the clock signal voltage CLK. The clock signal voltage CLK is in a range from 0 to VCC. When the clock signal voltage CLK is in a clock signal logic low state, the output voltage Vout charges the second flying capacitor C12 up to a first voltage level equal to the output voltage (Vout) of the power converter. When the clock signal voltage is in a clock signal logic high state, the voltage on the common node of D12 and C12 is equal to the sum of Vout and VCC minus the diode voltage drop. This voltage on the common node of D12 and C12 charges the bootstrap capacitor Cbst through the body diode of the second auxiliary switch Q12. In the high impedance PFM mode, the voltage on the switching node SW is equal to Vout. The charge from the switched capacitor bootstrap circuit maintains the voltage across Cbst equal to VCC minus the sum of the diode voltage drop of D12 and the voltage drop of the body diode of Q12.

In operation, when the power converter operates in in another operating mode such as a PWM mode, TRI is in a logic low state. The inverted signal of TRI is in a logic high state. The voltage across C11 is equal to the bias voltage VCC minus the diode voltage drop of D11. When the PWM voltage is in a logic high state, the gate voltage of Q11 is equal to 2 times VCC minus the diode voltage drop of D11 (2×VCC-VD). VD is the voltage drop across D11. The gate voltage of Q11 is greater than the source voltage of Q11. As a result, Q11 is turned on. When the PWM voltage is in the logic high state, Q2 is turned on and the switching node SW is pulled down to zero. VCC charges the bootstrap capacitor Cbst through the turned on Q11. When TRI is in the logic low state, the AND gate 221 outputs a logic low voltage. The voltage across C12 is equal to Vout minus a diode voltage drop. The voltage across C12 is less than the voltage on the BST bus. Therefore, the body diode of Q12 is reverse biased. The reversed biased body diode blocks any current flow.

One advantageous feature of having the active bootstrap circuit 201 is that the bootstrap diode in the traditional bootstrap circuit (e.g., D1 in FIG. 1) has been replaced by Q11. The voltage drop on the bootstrap diode causes a significant power loss. Q11 helps to reduce this power loss, thereby improving the efficiency of the power converter.

It should be noted that the function units shown in FIG. 3 are merely an example, which should not unduly limit the scope of the claims. Depending on different applications and design needs, other function units may be included.

Figure 4:
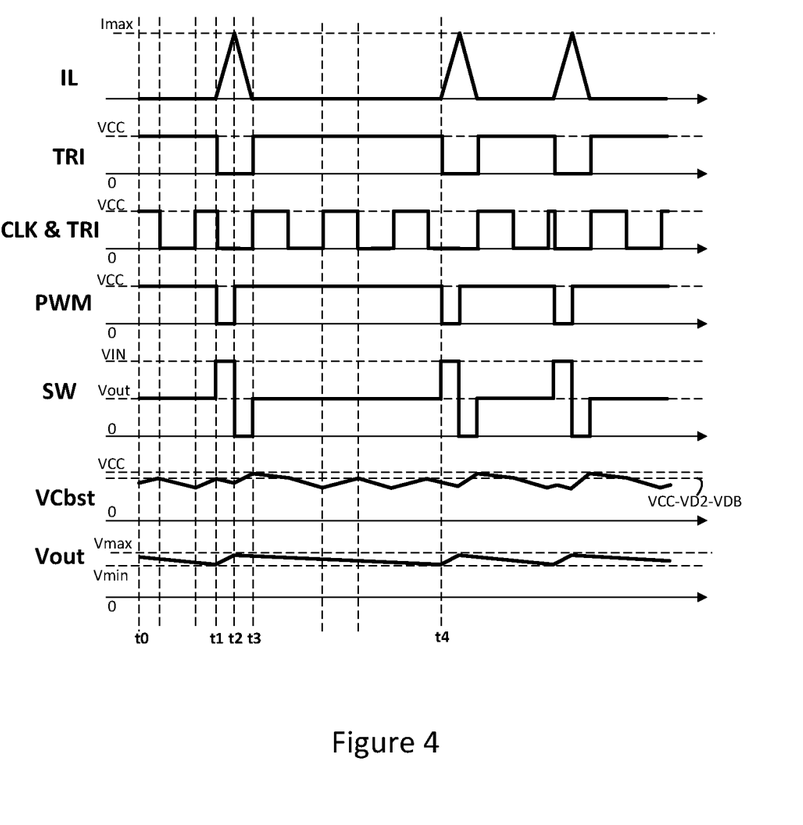
FIG. 4 illustrates various waveforms associated with the bootstrap circuit shown in FIG. 3 in accordance with various embodiments of the present disclosure.

FIG. 4 illustrates various waveforms associated with the bootstrap circuit shown in FIG. 3 in accordance with various embodiments of the present disclosure. The horizontal axis of FIG. 4 represents intervals of time. There may be seven rows in FIG. 4. The first row represents the current (IL) flowing through the inductor L1 from the switch node SW to the output node Vout. The second row represents the high impedance operation indication signal TRI. The third row represents the result of performing an AND operation on the clock signal voltage CLK and TRI. The fourth row represents the PWM voltage. The fifth row represents the voltage on the switching node SW. The sixth row represents the voltage across the bootstrap capacitor Cbst. The seventh row represents the output voltage Vout of the power converter.

When the power converter in FIG. 3 operates in a PFM mode, at t0, the inductor current is approximately equal to zero. The circuit is in a high impedance state. The signal TRI is at a logic high level indicating the high impedance state. The voltage on the switch node SW is approximately equal to the output voltage Vout. From t0 to t1, the output voltage Vout slowly drops due to the light load connected to the output of the power converter.

At t1, when the output voltage Vout drops to a predetermined threshold voltage Vmin, the power converter leaves the high impedance state. In response to this change, TRI changes from a logic high level to a logic low level at t1. The PWM signal is activated to turn on the high-side switch Q1 and turn off the low-side switch Q2. As a result, the switch node SW is connected to the input voltage VIN. In the PWM mode, the active bootstrap circuit 201 starts to charge the first flying capacitor C11 under the control of the PWM signal. From t1 to t2, the current IL flowing through the inductor L1 starts to increase. As shown in FIG. 4, at t2, the inductor current IL and the output voltage Vout reach the peak values Imax and Vmax respectively.

At t2, the PWM signal changes from a logic low level to a logic high level. In response to this change, the high-side switch Q1 is turned off and the low-side switch Q2 is turned on. The switching node SW is connected to ground. The current IL starts to drop. At t2, the logic high level of the PWM signal raises the voltage on the common node of C11 and D11. This voltage turns on Q11 so that the bias voltage VCC charges the bootstrap capacitor Cbst from t2 to t3.

At t3, the inductor current IL drops to zero. In response to it, the power converter leaves the PWM mode and enters into the high impedance mode again. At t3, TRI is at a logic high level. Both the high-side switch Q1 and the low-side switch Q2 are turned off. From t3 to t4, the first flying capacitor C11 is always grounded. The first auxiliary switch Q11 is kept off.

From t3 to t4, the switched capacitor bootstrap circuit 202 is employed to charge the bootstrap capacitor Cbst. After t3, when the clock signal voltage CLK is at a logic high level, the voltage on the common node of D12 and C12 is equal to (Vout+VCC-VD). This voltage charges Cbst through the body diode of Q12. The voltage across Cbst is charged up to a voltage level equal to (VCC-VD-VB). VD is the diode voltage drop of D12. VB is the diode voltage drop of the body diode of Q11. When the clock signal CLK is at a logic low level, the voltage on the common node of D12 and C12 is equal to (Vout-VD), hence the body diode of Q12 is reverse biased and the voltage across Cbst gradually drops as it supplies power to the auxiliary circuits 110, until the clock signal CLK is at a logic high level again, which allows the bootstrap capacitor Cbst to be charged again. Through a proper frequency selection of the clock signal CLK, the voltage across the boot strap capacitor Cbst can be maintained in the vicinity of (VCC-VD-VB) in order to power the auxiliary circuits 110.

Meanwhile, from t3 to t4, the voltage on Vout drop slowly due to the light load connected the output of the power converter. At t4, the output voltage Vout drops to the threshold voltage Vmin again. The power converter exits the high impedance mode. TRI changes from a logic high level to a logic low level at t4. The power converter repeats the process of charging Cbst as described above.

One advantageous feature of having the bootstrap circuit control method shown in FIG. 4 is that in comparison with the traditional bootstrap circuit, the switched capacitor bootstrap circuit can provide bias power for the bootstrap capacitor Cbst in the high impedance mode when the power converter operates in the PFM mode. It does not require to turn on the low-side switch Q2 intermittently to charge the bootstrap capacitor Cbst, thereby reducing the switching loss in the PFM mode.

In comparison with the traditional bootstrap circuit, although the bootstrap circuit shown in FIG. 2 can reduce the switching loss in the PFM mode, additional components for the active bootstrap circuit and the switched capacitor bootstrap circuit increase the cost. In particular, each of the two bootstrap circuits requires a flying capacitor (e.g., C11 or C12), and in high-voltage applications, both bootstrap circuits require high-voltage switches (e.g., Q11 and Q12). These two high voltage switches occupy a relatively large area in the chip implementation, thereby increasing the cost.

Some discrete components such as flying capacitors and/or diodes can be shared by the two bootstrap circuits through a plurality of multiplexers. This implementation will be discussed below with respect to FIG. 5. Furthermore, at least one multiplexer of the plurality of multiplexers may be replaced by a plurality of discrete components. This implementation will be discussed below with respect to FIG. 6.

Figure 5:
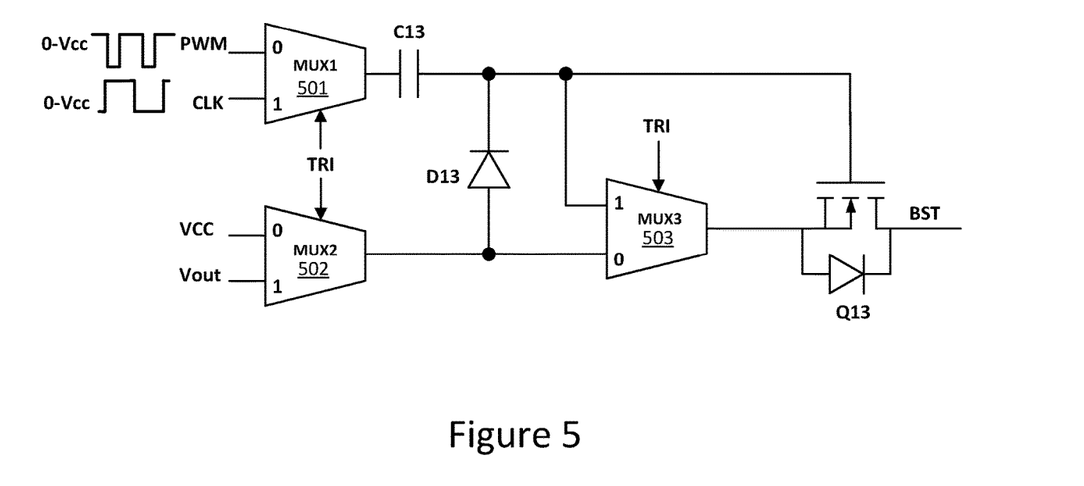
FIG. 5 illustrates a second implementation of the bootstrap circuit shown in FIG. 2 in accordance with various embodiments of the present disclosure.

FIG. 5 illustrates a second implementation of the bootstrap circuit shown in FIG. 2 in accordance with various embodiments of the present disclosure. The bias power control circuit 205 comprises a first multiplexer 501, a second multiplexer 502, a third multiplexer 503, an auxiliary switch Q13, a flying capacitor C13 and a diode D13.

A first input of the first multiplexer 501 is configured to receive a PWM voltage. A second input of the first multiplexer 501 is configured to receive a clock signal voltage CLK. A first input of the second multiplexer 502 is configured to receive a bias voltage VCC. A second input of the second multiplexer 502 is configured to receive an output voltage Vout of the power converter.

The flying capacitor C13 and the diode D13 are connected in series between an output of the first multiplexer 501 and an output of the second multiplexer 502. As shown in FIG. 5, a cathode of the diode D13 is connected to the flying capacitor C13.

A first input of the third multiplexer 503 is connected to a common node of the flying capacitor C13 and the diode D13. A second input of the third multiplexer 503 is connected to the output of the second multiplexer 502. A gate of the auxiliary switch Q13 is connected to the common node of the flying capacitor C13 and the diode D13. A first drain/source terminal of Q13 is connected to an output of the third multiplexer 503. A second drain/source terminal of Q13 is connected to the bootstrap capacitor Cbst. In some embodiments, the auxiliary switch Q13 is an n-type power switch. The first drain/source terminal of Q13 is a source terminal of Q13. The second drain/source terminal of Q13 is a drain terminal of Q13.

The first multiplexer 501 and the second multiplexer 502 are controlled by TRI as shown in FIG. 5. When TRI is at a logic high level ("1"), the second input of the multiplexers is selected. When TRI is at a logic low level ("0"), the first input of the multiplexers is selected. The third multiplexer 503 is also controlled by TRI as shown in FIG. 5. When TRI is at a logic high level ("1"), the second input of the third multiplexer 503 is selected. When TRI is at a logic low level ("0"), the first input of the third multiplexer 503 is selected.

In operation, when the power converter operates in the high impedance PFM mode, TRI is at a logic high level. In response to the logic high level ("1"), the signal fed into the second input of the first multiplexer 501 passes through the first multiplexer 501. Likewise, the signal fed into the second input of the second multiplexer 502 passes through the second multiplexer 502. In other words, the first multiplexer 501 is configured to select the clock signal voltage CLK to be connected with the flying capacitor C13. The second multiplexer 502 is configured to select the output voltage Vout of the power converter to be connected with the diode D13.

The third multiplexer 503 is also controlled by TRI. In response to the logic high level ("1") of TRI, the signal fed into the second input of the third multiplexer 503 passes through the third multiplexer 503. In other words, the third multiplexer 503 is configured to select the common node of the flying capacitor C13 and the diode D13 to be connected with the first drain/source terminal of the auxiliary switch Q13. As a result of configuring the first multiplexer 501, the second multiplexer 502 and the third multiplexer 503, the flying capacitor C13 and the diode D13 form a switched capacitor bootstrap circuit to provide bias power for the power converter in the high impedance PFM mode.

In operation, when the power converter operates in another operating mode such as a PWM mode, TRI is at a logic low level. In response to the logic low level ("0"), the signal fed into the first input of the first multiplexer 501 passes through the first multiplexer 501. Likewise, the signal fed into the first input of the second multiplexer 502 passes through the second multiplexer 502. In other words, the first multiplexer 501 is configured to select the PWM voltage to be connected with the flying capacitor C13. The second multiplexer 502 is configured to select the bias voltage VCC to be connected with the diode D13.

The third multiplexer 503 is also controlled by TRI. In response to the logic low level ("0") of TRI, the signal fed into the first input of the third multiplexer 503 passes through the third multiplexer 503. In other words, the third multiplexer 503 is configured to select the bias voltage VCC to be connected with the first drain/source terminal of the auxiliary switch Q13. As a result of configuring the first multiplexer 501, the second multiplexer 502 and the third multiplexer 503, the flying capacitor C13 and the diode D13 form an active bootstrap circuit to provide the bias power for the power converter in the PWM mode.

Figure 6:
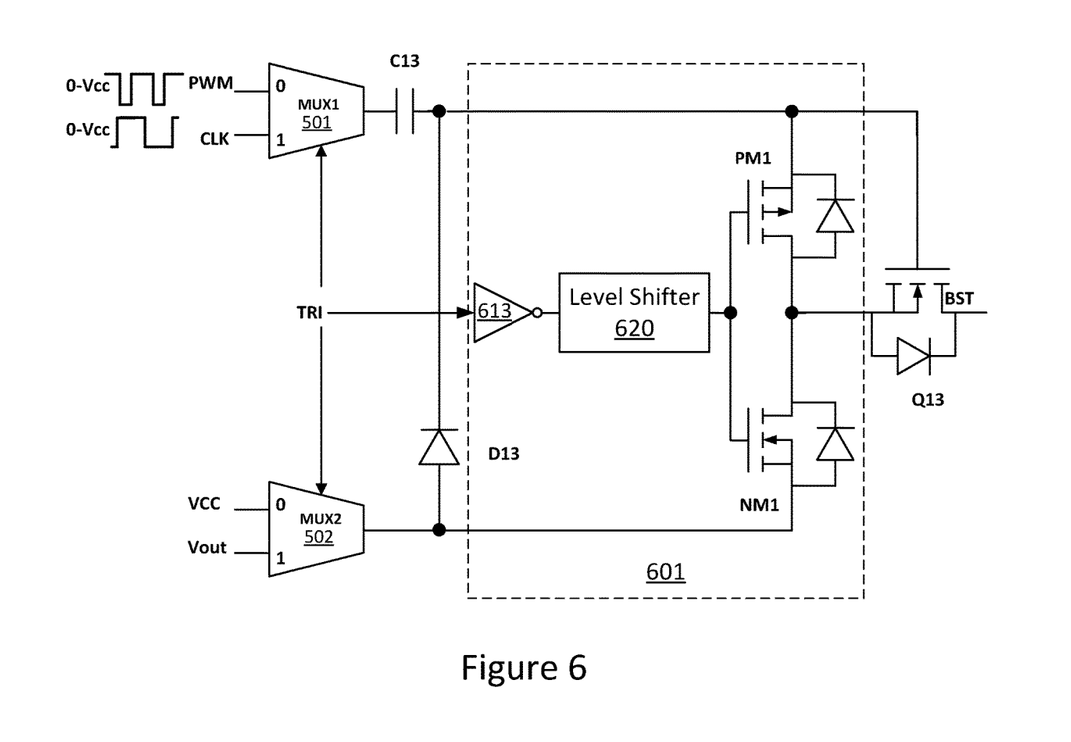
FIG. 6 illustrates a third implementation of the bootstrap circuit shown in FIG. 2 in accordance with various embodiments of the present disclosure.

FIG. 6 illustrates a third implementation of the bootstrap circuit shown in FIG. 2 in accordance with various embodiments of the present disclosure. The bootstrap circuit comprises a first multiplexer 501, a second multiplexer 502, an auxiliary switch Q13, a flying capacitor C13, a diode D13, an inverter 613, a level shifter 620, a p-type transistor PM1 and an n-type transistor NM1.

The p-type transistor PM1 and the n-type transistor NM1 are connected in series between a common node of the flying capacitor C13 and the diode D13, and an output of the second multiplexer 502. The inverter 613 is configured to receive the high impedance operation indication signal TRI. The level shifter 620 is configured to translate an output signal of the inverter 613 into a corresponding signal with reference to the output voltage of the second multiplexer 502. In some embodiments, the inverter 613, the level shifter 620, the p-type transistor PM1 and the n-type transistor NM1 form a third multiplexer 601.

A first input of the first multiplexer 501 is configured to receive a PWM voltage. A second input of the first multiplexer 501 is configured to receive a clock signal voltage CLK. A first input of the second multiplexer 502 is configured to receive a bias voltage VCC. A second input of the second multiplexer 502 is configured to receive an output voltage Vout of the power converter.

The flying capacitor C13 and the diode D13 are connected in series between an output of the first multiplexer 501 and an output of the second multiplexer 502. As shown in FIG. 6, a cathode of the diode D13 is connected to the flying capacitor C13.

The third multiplexer 601 is formed by the p-type transistor PM1, the n-type transistor NM1, the inverter 613 and the level shifter 620. As shown in FIG. 6, the p-type transistor PM1 and the n-type transistor NM1 are connected in series between a common node of the flying capacitor C13 and the diode D13, and the output of the second multiplexer 502. The inverter 613 is configured to receive the high impedance operation indication signal TRI. The level shifter 620 is configured to translate an output signal of the inverter 613 into a corresponding signal with reference to the output voltage of the second multiplexer 502. The gates of the p-type transistor PM1 and the n-type transistor NM1 are connected to an output of the level shifter 620.

A gate of the auxiliary switch Q13 is connected to the common node of the flying capacitor C13 and the diode D13. A first drain/source terminal of Q13 is connected to a common node of PM1 and NM1. A second drain/source terminal of Q13 is connected to the bootstrap capacitor Cbst.

In some embodiments, the auxiliary switch Q13 is an n-type power switch. The first drain/source terminal of Q13 is a source terminal of Q13. The second drain/source terminal of Q13 is a drain terminal of Q13.

In operation, when the power converter operates in the high impedance PFM mode, TRI is at a logic high level. In response to the logic high level ("1"), the signal fed into the second input of the first multiplexer 501 passes through the first multiplexer 501. Likewise, the signal fed into the second input of the second multiplexer 502 passes through the second multiplexer 502. In other words, the first multiplexer 501 is configured to select the clock signal voltage CLK to be connected with the flying capacitor C13. The second multiplexer 502 is configured to select the output voltage Vout of the power converter to be connected with the diode D13.

The inverter 613 converts the logic high level of TRI into a logic low signal. Through the level shifter 620, the logic low signal is applied to the gates of PM1 and NM1. According to the operating principles of PM1 and NM1, the p-type transistor PM1 is turned on, and the n-type transistor NM1 is turned off. The common node of the flying capacitor C13 and the diode D13 is connected with the first drain/source terminal of the auxiliary switch Q13 through the turned on PM1. The gate and source of Q13 are connected together through the turned on PM1. As a result of configuring the first multiplexer 501, the second multiplexer 502, the p-type transistor PM1 and the n-type transistor NM1, the flying capacitor C13 and the diode D13 form a switched capacitor bootstrap circuit to provide the bias power for the power converter in the high impedance PFM mode. In particular, the voltage on the common node of C13 and D13 is applied to Cbst through the body diode of Q13.

In operation, when the power converter operates in another operating mode such as a PWM mode, TRI is at a logic low level. In response to the logic low level ("0"), the signal fed into the first input of the first multiplexer 501 passes through the first multiplexer 501. Likewise, the signal fed into the first input of the second multiplexer 502 passes through the second multiplexer 502. In other words, the first multiplexer 501 is configured to select the PWM voltage to be connected with the flying capacitor C13. The second multiplexer 502 is configured to select the bias voltage VCC to be connected with the diode D13.

The inverter 613 converts the logic low level of TRI into a logic high signal. Through the level shifter 620, the logic high signal is applied to the gates of PM1 and NM1. According to the operating principles of PM1 and NM1, the p-type transistor PM1 is turned off, and the n-type transistor NM1 is turned on. The bias voltage VCC is connected with the first drain/source terminal of the auxiliary switch Q13 through the turned on NM1. The voltage on the common node of C13 and D13 is fed into the gate of Q13. When the PWM voltage is at a logic high level, the voltage on the common node of C13 and D13 is equal to two times VCC. The gate voltage (2×VCC) is greater than the source voltage. As a result, Q13 is turned on, and the bias voltage VCC charges Cbst through the turned on Q13. In sum, the first multiplexer 501, the second multiplexer 502, the p-type transistor PM1, the n-type transistor NM1, the flying capacitor C13 and the diode D13 form an active bootstrap circuit to provide the bias power for the power converter in the other modes (e.g., a PWM mode).

As described above, the drain-source voltages of PM1 and NM1 are always less than VCC. As such, PM1 and NM1 can be implemented as low-voltage switches and occupy a small chip area.

It should be noted that the clock signal CLK and the PWM signal in FIGS. 3, 5 and 6 can be generated separately and passed to the bootstrap circuit through suitable logic circuits. Alternatively, CLK and PMW signals can be generated by a controller. The controller outputs the corresponding control signals according to different operating modes. Furthermore, the diodes in FIGS. 3, 5 and 6 can also be implemented by active switches to reduce the voltage drop across the diodes.

It should further be noted that the buck converter shown in FIG. 3 is merely an example. The various embodiments of the present disclosure are applicable to any power conversion system having a high-side switch (e.g., a half-bridge power converter).

Figure 7:
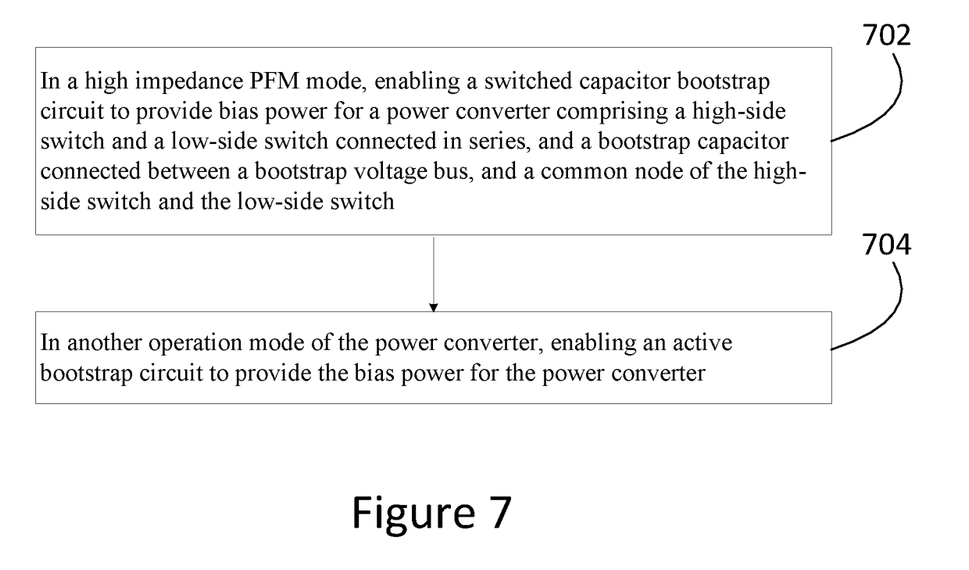
FIG. 7 illustrates a flow chart of controlling the bootstrap circuit shown in FIG. 2 in accordance with various embodiments of the present disclosure.

FIG. 7 illustrates a flow chart of controlling the bootstrap circuit shown in FIG. 2 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

At step 702, in a high impedance PFM mode, a switched capacitor bootstrap circuit is enabled to provide bias power for a power converter comprising a high-side switch and a low-side switch connected in series, and a bootstrap capacitor connected between a bootstrap voltage bus, and a common node of the high-side switch and the low-side switch.

At step 704, in another operation mode of the power converter, an active bootstrap circuit is enabled to provide the bias power for the power converter.

Referring back to FIG. 3, the power converter comprises the high-side switch and the low-side switch connected in series between an input voltage bus and ground, an inductor coupled between the common node of the high-side switch and the low-side switch, and an output of the power converter, and an output capacitor coupled between the output of the power converter and ground.

Referring back to FIG. 3, the active bootstrap circuit comprises a first diode and a first flying capacitor connected in series between a bias voltage and a PWM voltage when the power converter is configured to operate in an operating mode other than the high impedance PFM mode, and a first auxiliary switch having a gate connected to a common node of the first diode and the first flying capacitor, a first drain/source terminal connected to the bias voltage and a second drain/source terminal connected to the bootstrap capacitor. The switched capacitor bootstrap circuit comprises a second diode and a second flying capacitor connected in series between an output voltage of the power converter and a clock signal voltage when the power converter is in the high impedance PFM mode, and a second auxiliary switch having a second drain/source terminal connected to the bootstrap capacitor, and a gate and a first drain/source terminal connected together, and further connected to a common node of the second diode and the second flying capacitor.

Referring back to FIG. 3, the method further comprises in the high impedance PFM mode, charging the second flying capacitor up to a first voltage level equal to the output voltage of the power converter when the clock signal voltage is in a clock signal logic low state, and charging the bootstrap capacitor through a body diode of the second auxiliary switch when the clock signal voltage is in a clock signal logic high state.

Referring back to FIG. 3, the method further comprises, in the operating mode of the power converter other than the high impedance PFM mode, charging the first flying capacitor up to a voltage level equal to the bias voltage when the PWM voltage is in a PWM logic low state, and turning on the first auxiliary switch to charge the bootstrap capacitor when the PWM voltage is in a PWM logic high state.

Referring back to FIG. 5, the switched capacitor bootstrap circuit and the active bootstrap circuit and an auxiliary switch form a bootstrap apparatus comprising a first multiplexer, a second multiplexer, a third multiplexer, a flying capacitor, a diode and the auxiliary switch, and wherein the first multiplexer has a first input configured to receive a PWM voltage, and a second input configured to receive a clock signal voltage, and wherein the first multiplexer is controlled by a high impedance operation indication signal, the second multiplexer has a first input configured to receive a bias voltage, and a second input configured to receive an output voltage of the power converter, and wherein the second multiplexer is controlled by the high impedance operation indication signal, the flying capacitor and the diode are connected in series between an output of the first multiplexer and an output of the second multiplexer, and wherein a cathode of the diode is connected to the flying capacitor, the third multiplexer has a second input connected to a common node of the flying capacitor and the diode, and a first input connected to the output of the second multiplexer, and wherein the third multiplexer is controlled by the high impedance operation indication signal, and the auxiliary switch has a gate connected to the common node of the flying capacitor and the diode, a first drain/source terminal connected to an output of the third multiplexer and a second drain/source terminal connected to the bootstrap capacitor.

Referring back to FIG. 5, the method further comprises, in the high impedance PFM mode, configuring the first multiplexer to select the clock signal voltage to be connected with the flying capacitor, configuring the second multiplexer to select the output voltage of the power converter to be connected with the diode, and configuring the third multiplexer to select the common node of the flying capacitor and the diode to be connected with the first drain/source terminal of the auxiliary switch, and wherein as a result of configuring the first multiplexer, the second multiplexer and the third multiplexer, the flying capacitor and the diode form the switched capacitor bootstrap circuit to provide the bias power for the power converter in the high impedance PFM mode.

Referring back to FIG. 5, the method further comprises, in an operation mode of the power converter other than the high impedance PFM mode, configuring the first multiplexer to select the PWM voltage to be connected with the flying capacitor, configuring the second multiplexer to select the bias voltage to be connected with the diode, and configuring the third multiplexer to select the bias voltage to be connected with the first drain/source terminal of the auxiliary switch, and wherein as a result of configuring the first multiplexer, the second multiplexer and the third multiplexer, the flying capacitor and the diode form the active bootstrap circuit to provide the bias power for the power converter in the other operation modes of the power converter.

Referring back to FIG. 6, a first multiplexer having a first input configured to receive a PWM voltage, and a second input configured to receive a clock signal voltage, and wherein the first multiplexer is controlled by a high impedance operation indication signal, a second multiplexer having a first input configured to receive a bias voltage, a and second input configured to receive an output voltage of the apparatus, and wherein the second multiplexer is controlled by the high impedance operation indication signal, a flying capacitor and a diode connected in series between an output of the first multiplexer and an output of the second multiplexer, and wherein a cathode of the diode is connected to the flying capacitor, a third multiplexer formed by a p-type transistor, an n-type transistor, an inverter and a level shifter, and wherein the p-type transistor and the n-type transistor are connected in series between a common node of the flying capacitor and the diode, and an output of the second multiplexer, the inverter is configured to receive the high impedance operation indication signal, and the level shifter is configured to translate an output signal of the inverter into a corresponding signal with reference to the output voltage of the second multiplexer, and wherein gates of the p-type transistor and the n-type transistor are connected to an output of the level shifter, and an auxiliary switch having a gate connected to the common node of the flying capacitor and the diode, a first drain/source terminal connected to a common node of the p-type transistor and the n-type transistor, and a second drain/source terminal connected to the bootstrap capacitor.

Referring back to FIG. 6, the method further comprises, in the high impedance PFM mode, configuring the first multiplexer to select the clock signal voltage to be connected with the flying capacitor, in the high impedance PFM mode, configuring the second multiplexer to select the output voltage of the power converter to be connected with the diode, in the high impedance PFM mode, configuring the p-type transistor and the n-type transistor to select the common node of the flying capacitor and the diode to be connected with the first drain/source terminal of the auxiliary switch, and wherein as a result of configuring the first multiplexer, the second multiplexer, the p-type transistor and the n-type transistor, the flying capacitor and the diode form the switched capacitor bootstrap circuit to provide the bias power for the power converter in the high impedance PFM mode.

Referring back to FIG. 6, the method further comprises, in the other operation modes of the power converter, configuring the first multiplexer to select the PWM voltage to be connected with the flying capacitor, in the other operation modes of the power converter, configuring the second multiplexer to select the bias voltage to be connected with the diode, and in the other operation modes of the power converter, configuring the p-type transistor and the n-type transistor to select the bias voltage to be connected with the first drain/source terminal of the auxiliary switch, and wherein as a result of configuring the first multiplexer, the second multiplexer, the p-type transistor and the n-type transistor, the flying capacitor and the diode form the active bootstrap circuit to provide the bias power for the power converter in the other operation modes of the power converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a first switch and a second switch connected in series between an input voltage bus and ground;
a bootstrap capacitor connected between a bootstrap voltage bus, and a common node of the first switch and the second switch; and
a bias power control circuit configured to function as a switched capacitor bootstrap circuit when the apparatus is configured to operate in a high impedance pulse frequency modulation (PFM) mode, and configured to function as an active bootstrap circuit when the apparatus is configured to operate in another operating mode, wherein the bias power control circuit comprises a first bootstrap circuit configured as the active bootstrap circuit, and a second bootstrap circuit configured as the switched capacitor bootstrap circuit, and wherein first bootstrap circuit comprises a first diode and a first flying capacitor connected in series between a bias voltage and a PWM voltage when the apparatus is configured to operate in another operating mode, and a first auxiliary switch having a gate connected to a common node of the first diode and the first flying capacitor, a first drain/source terminal connected to the bias voltage and a second drain/source terminal connected to the bootstrap capacitor.

2. The apparatus of claim 1, further comprising:
an inductor coupled between the common node of the first switch and the second switch, and an output of the apparatus; and
an output capacitor coupled between the output of the apparatus and ground.

3. The apparatus of claim 1, wherein the second bootstrap circuit comprises:
a second diode and a second flying capacitor connected in series between an output voltage of the apparatus and a clock signal voltage when the apparatus is configured to operate in the high impedance PFM mode; and
a second auxiliary switch having a second drain/source terminal connected to the bootstrap capacitor, and a gate and a first drain/source terminal connected together, and further connected to a common node of the second diode and the second flying capacitor.

4. The apparatus of claim 1, wherein the bias power control circuit comprises:
a first multiplexer having a first input configured to receive a PWM voltage, and a second input configured to receive a clock signal voltage, and wherein the first multiplexer is controlled by a high impedance operation indication signal;
a second multiplexer having a first input configured to receive a bias voltage, and a second input configured to receive an output voltage of the apparatus, and wherein the second multiplexer is controlled by the high impedance operation indication signal;
a flying capacitor and a diode connected in series between an output of the first multiplexer and an output of the second multiplexer, and wherein a cathode of the diode is connected to the flying capacitor;
a third multiplexer having a second input connected to a common node of the flying capacitor and the diode, and a first input connected to the output of the second multiplexer, and wherein the third multiplexer is controlled by the high impedance operation indication signal; and
an auxiliary switch having a gate connected to the common node of the flying capacitor and the diode, a first drain/source terminal connected to an output of the third multiplexer and a second drain/source terminal connected to the bootstrap capacitor.

5. The apparatus of claim 1, wherein the bias power control circuit comprises:
a first multiplexer having a first input configured to receive a PWM voltage, and a second input configured to receive a clock signal voltage, and wherein the first multiplexer is controlled by a high impedance operation indication signal;
a second multiplexer having a first input configured to receive a bias voltage, a and second input configured to receive an output voltage of the apparatus, and wherein the second multiplexer is controlled by the high impedance operation indication signal;
a flying capacitor and a diode connected in series between an output of the first multiplexer and an output of the second multiplexer, and wherein a cathode of the diode is connected to the flying capacitor;
a third multiplexer formed by a p-type transistor, an n-type transistor, an inverter and a level shifter, and wherein:
the p-type transistor and the n-type transistor are connected in series between a common node of the flying capacitor and the diode, and the output of the second multiplexer;
the inverter is configured to receive the high impedance operation indication signal; and
the level shifter is configured to translate an output signal of the inverter into a corresponding signal with reference to the output voltage of the second multiplexer, and wherein gates of the p-type transistor and the n-type transistor are connected to an output of the level shifter; and
an auxiliary switch having a gate connected to the common node of the flying capacitor and the diode, a first drain/source terminal connected to a common node of the p-type transistor and the n-type transistor, and a second drain/source terminal connected to the bootstrap capacitor.

6. A method comprising:
in a high impedance PFM mode, enabling a switched capacitor bootstrap circuit to provide bias power for a power converter comprising a high-side switch and a low-side switch connected in series, and a bootstrap capacitor connected between a bootstrap voltage bus, and a common node of the high-side switch and the low-side switch; and
in another operation mode of the power converter, enabling an active bootstrap circuit to provide the bias power for the power converter, wherein:
the active bootstrap circuit comprises:
a first diode and a first flying capacitor connected in series between a bias voltage and a PWM voltage when the power converter is configured to operate in an operating mode other than the high impedance PFM mode; and
a first auxiliary switch having a gate connected to a common node of the first diode and the first flying capacitor, a first drain/source terminal connected to the bias voltage and a second drain/source terminal connected to the bootstrap capacitor.

7. The method of claim 6, wherein the power converter comprises:
the high-side switch and the low-side switch connected in series between an input voltage bus and ground;
an inductor coupled between the common node of the high-side switch and the low-side switch, and an output of the power converter; and
an output capacitor coupled between the output of the power converter and ground.

8. The method of claim 6, wherein:
the switched capacitor bootstrap circuit comprises:
a second diode and a second flying capacitor connected in series between an output voltage of the power converter and a clock signal voltage when the power converter is in the high impedance PFM mode; and
a second auxiliary switch having a second drain/source terminal connected to the bootstrap capacitor, and a gate and a first drain/source terminal connected together, and further connected to a common node of the second diode and the second flying capacitor.

9. The method of claim 8, further comprising:
in the high impedance PFM mode, charging the second flying capacitor up to a first voltage level equal to the output voltage of the power converter when the clock signal voltage is in a clock signal logic low state, and charging the bootstrap capacitor through a body diode of the second auxiliary switch when the clock signal voltage is in a clock signal logic high state.

10. The method of claim 6, further comprising:
in the operating mode of the power converter other than the high impedance PFM mode, charging the first flying capacitor up to a voltage level equal to the bias voltage when the PWM voltage is in a PWM logic low state, and turning on the first auxiliary switch to charge the bootstrap capacitor when the PWM voltage is in a PWM logic high state.

11. The method of claim 6, wherein the switched capacitor bootstrap circuit and the active bootstrap circuit and an auxiliary switch form a bootstrap apparatus comprising a first multiplexer, a second multiplexer, a third multiplexer, a flying capacitor, a diode and the auxiliary switch, and wherein:
the first multiplexer has a first input configured to receive a PWM voltage, and a second input configured to receive a clock signal voltage, and wherein the first multiplexer is controlled by a high impedance operation indication signal;
the second multiplexer has a first input configured to receive a bias voltage, and a second input configured to receive an output voltage of the power converter, and wherein the second multiplexer is controlled by the high impedance operation indication signal;
the flying capacitor and the diode are connected in series between an output of the first multiplexer and an output of the second multiplexer, and wherein a cathode of the diode is connected to the flying capacitor;
the third multiplexer has a second input connected to a common node of the flying capacitor and the diode, and a first input connected to the output of the second multiplexer, and wherein the third multiplexer is controlled by the high impedance operation indication signal; and
the auxiliary switch has a gate connected to the common node of the flying capacitor and the diode, a first drain/source terminal connected to an output of the third multiplexer and a second drain/source terminal connected to the bootstrap capacitor.

12. The method of claim 11, further comprising:
in the high impedance PFM mode, configuring the first multiplexer to select the clock signal voltage to be connected with the flying capacitor;
configuring the second multiplexer to select the output voltage of the power converter to be connected with the diode; and
configuring the third multiplexer to select the common node of the flying capacitor and the diode to be connected with the first drain/source terminal of the auxiliary switch, and wherein as a result of configuring the first multiplexer, the second multiplexer and the third multiplexer, the flying capacitor and the diode form the switched capacitor bootstrap circuit to provide the bias power for the power converter in the high impedance PFM mode.

13. The method of claim 11, further comprising:
in an operation mode of the power converter other than the high impedance PFM mode, configuring the first multiplexer to select the PWM voltage to be connected with the flying capacitor;
configuring the second multiplexer to select the bias voltage to be connected with the diode; and
configuring the third multiplexer to select the bias voltage to be connected with the first drain/source terminal of the auxiliary switch, and wherein as a result of configuring the first multiplexer, the second multiplexer and the third multiplexer, the flying capacitor and the diode form the active bootstrap circuit to provide the bias power for the power converter in the other operation modes of the power converter.

14. The method of claim 6, wherein the bias power control circuit comprises:
a first multiplexer having a first input configured to receive a PWM voltage, and a second input configured to receive a clock signal voltage, and wherein the first multiplexer is controlled by a high impedance operation indication signal;
a second multiplexer having a first input configured to receive a bias voltage, a and second input configured to receive an output voltage of the apparatus, and wherein the second multiplexer is controlled by the high impedance operation indication signal;
a flying capacitor and a diode connected in series between an output of the first multiplexer and an output of the second multiplexer, and wherein a cathode of the diode is connected to the flying capacitor;
a third multiplexer formed by a p-type transistor, an n-type transistor, an inverter and a level shifter, and wherein:
the p-type transistor and the n-type transistor are connected in series between a common node of the flying capacitor and the diode, and an output of the second multiplexer;
the inverter is configured to receive the high impedance operation indication signal; and
the level shifter is configured to translate an output signal of the inverter into a corresponding signal with reference to the output voltage of the second multiplexer, and wherein gates of the p-type transistor and the n-type transistor are connected to an output of the level shifter; and
an auxiliary switch having a gate connected to the common node of the flying capacitor and the diode, a first drain/source terminal connected to a common node of the p-type transistor and the n-type transistor, and a second drain/source terminal connected to the bootstrap capacitor.

15. The method of claim 14, further comprising:
in the high impedance PFM mode, configuring the first multiplexer to select the clock signal voltage to be connected with the flying capacitor;
in the high impedance PFM mode, configuring the second multiplexer to select the output voltage of the power converter to be connected with the diode;
in the high impedance PFM mode, configuring the p-type transistor and the n-type transistor to select the common node of the flying capacitor and the diode to be connected with the first drain/source terminal of the auxiliary switch, and wherein as a result of configuring the first multiplexer, the second multiplexer, the p-type transistor and the n-type transistor, the flying capacitor and the diode form the switched capacitor bootstrap circuit to provide the bias power for the power converter in the high impedance PFM mode;
in the other operation modes of the power converter, configuring the first multiplexer to select the PWM voltage to be connected with the flying capacitor;
in the other operation modes of the power converter, configuring the second multiplexer to select the bias voltage to be connected with the diode; and
in the other operation modes of the power converter, configuring the p-type transistor and the n-type transistor to select the bias voltage to be connected with the first drain/source terminal of the auxiliary switch, and wherein as a result of configuring the first multiplexer, the second multiplexer, the p-type transistor and the n-type transistor, the flying capacitor and the diode form the active bootstrap circuit to provide the bias power for the power converter in the other operation modes of the power converter.

16. A power converter comprising:
a high-side switch and a low-side switch connected in series between an input voltage bus and ground;
a bootstrap capacitor connected between a bootstrap voltage bus, and a common node of the high-side switch and the low-side switch;
an inductor coupled between the common node of the high-side switch and the low-side switch, and an output of the power converter;
an output capacitor coupled between the output of the power converter and ground; and
a bias power control circuit configured as a switched capacitor bootstrap circuit when the power converter is configured to operate in a high impedance PFM mode, and configured as an active bootstrap circuit when the power converter is configured to operate in another operating mode, wherein the bias power control circuit comprises an active bootstrap circuit and a switched capacitor bootstrap circuit, and wherein:

the active bootstrap circuit comprises:
a first diode and a first flying capacitor connected in series between a bias voltage and a PWM voltage when the power converter is configured to operate in an operating mode other than the high impedance PFM mode; and
a first auxiliary switch having a gate connected to a common node of the first diode and the first flying capacitor, a first drain/source terminal connected to the bias voltage and a second drain/source terminal connected to the bootstrap capacitor.

17. The power converter of claim 16, wherein
the switched capacitor bootstrap circuit comprises:
a second diode and a second flying capacitor connected in series between an output voltage of the power converter and a clock signal voltage when the power converter is configured to operate in the high impedance PFM mode; and
a second auxiliary switch having a second drain/source terminal connected to the bootstrap capacitor, and a gate and a first drain/source terminal connected together, and further connected to a common node of the second diode and the second flying capacitor.

18. The power converter of claim 16, wherein:
the switched capacitor bootstrap circuit and the active bootstrap circuit and an auxiliary switch form a bootstrap apparatus comprising a first multiplexer, a second multiplexer, a third multiplexer, a flying capacitor, a diode and the auxiliary switch, and wherein:
the first multiplexer has a first input configured to receive a PWM voltage, and a second input configured to receive a clock signal voltage, and wherein the first multiplexer is controlled by a high impedance operation indication signal;
the second multiplexer has a first input configured to receive a bias voltage, and a second input configured to receive an output voltage of the power converter, and wherein the second multiplexer is controlled by the high impedance operation indication signal;
the flying capacitor and the diode are connected in series between an output of the first multiplexer and an output of the second multiplexer, and wherein a cathode of the diode is connected to the flying capacitor;
the third multiplexer has a second input connected to a common node of the flying capacitor and the diode, and a first input connected to the output of the second multiplexer, and wherein the third multiplexer is controlled by the high impedance operation indication signal; and
the auxiliary switch has a gate connected to the common node of the flying capacitor and the diode, a first drain/source terminal connected to an output of the third multiplexer and a second drain/source terminal connected to the bootstrap capacitor.

* * * * *